Figure 2:
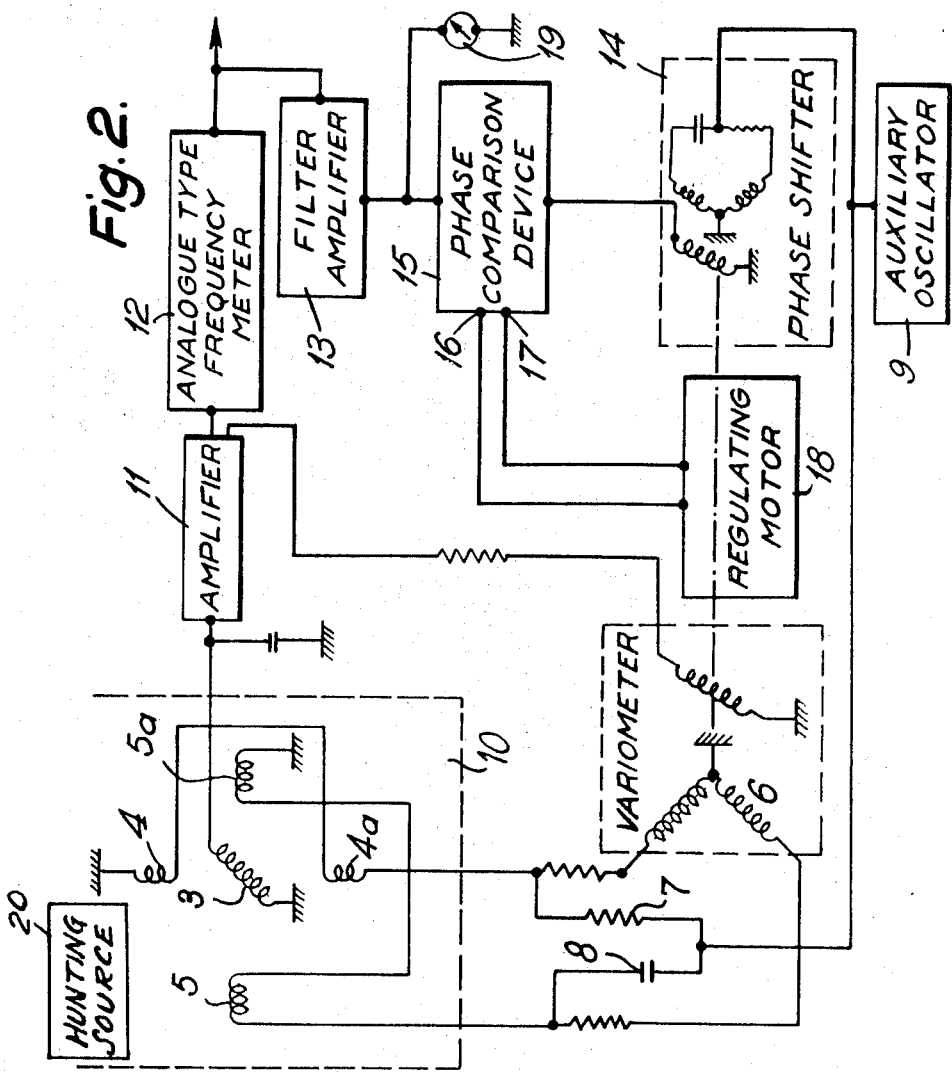

United States Patent [15] 3,648,157
Denis et al. [45] Mar. 7, 1972

[54] METHODS AND APPARATUS FOR MEASURING MAGNETIC FIELDS BY GYROMAGNETIC RESONANCE

[72] Inventors: Andre Maxime Philippe Denis, Herblay; Guy Marie Camille Ripart, Plessis-Robinson, both of France

[73] Assignee: Sud-Aviation Societe Nationale de Constructions Aeronautiques, Paris, France

[22] Filed: Dec. 11, 1963

[21] Appl. No.: 329,920

[30] Foreign Application Priority Data

Dec. 11, 1962 France .................................. 918217

[52] U.S. Cl. .......................................................... 324/.5
[51] Int. Cl. .................................................... G01r 33/08
[58] Field of Search ................ 324/0.5, 43, .5 MA, .5 F, .5 H, 324/.5 E

[56] References Cited

UNITED STATES PATENTS

| | | | |
|---|---|---|---|
| 2,589,494 | 3/1952 | Hershberger | 324/0.5 |
| 2,984,781 | 5/1961 | Schwede | 324/0.5 |
| 3,020,469 | 2/1962 | O'Reilly | 324/0.5 |
| 3,158,802 | 11/1964 | Jung et al. | 324/0.5 |

Primary Examiner—Rodney D. Bennett, Jr.
Assistant Examiner—N. Moskowitz
Attorney—Waters, Roditi & Schwartz

EXEMPLARY CLAIM

1. In an apparatus for measuring magnetic fields by gyromagnetic resonance, of the kind having a single container with a gyromagnetic substance and a detecting coil wound around said container, said gyromagnetic substance being subjected to the magnetic field to be measured and excitation at a suitable frequency thereby to change the electron energy level of the substance; the improvement comprising, in combination, two pairs of excitation coils respectively aligned along two mutually perpendicular axes and disposed around the detecting coil in a plane perpendicular to said detecting coil, the excitation coils aligned along the same axis being interconnected, a variometer having stationary windings respectively connected to the pairs of aligned excitation coils and a rotatable field winding, an amplifier the input of which is connected to the detecting coil while its output is connected to said rotatable field winding, an auxiliary oscillator generating signals at very low frequency under voltages of low amplitude, a resistor and a capacitor which are connected with said oscillator and respectively to the two pairs of aligned excitation coils, an analogue frequency-meter connected to the output of the amplifier, a filter-amplifier connected to the output of said frequency-meter in order to extract the signal at very low frequency delivered by the oscillator, a rotatable phase-shifter connected to the output of the auxiliary oscillator, a phase comparison device connected, on the one hand, to the filter-amplifier and, on the other hand, to said rotatable phase-shifter, and a motor mechanically coupled to said rotatable phase-shifter and to the rotatable field winding and fed by the output voltage of said phase comparison device.

9 Claims, 2 Drawing Figures

METHODS AND APPARATUS FOR MEASURING MAGNETIC FIELDS BY GYROMAGNETIC RESONANCE

It is known that when the electrons of an atom are excited under a suitable frequency, it is possible to obtain a change in the energy level of such electrons. This phenomenon is known as "hunting." Such levels however are not stable and result in what are known as avalanches. The electrons suddenly revert to the lower stable level and give up the energy stored during the hunting process. This energy then appears under two forms: an electromagnetic emission due to the oscillation of the electrons, and an electromagnetic emission due to the oscillation of the atomic nucleus. These oscillations are characterized by natural frequencies that are endowed with the peculiar property of being strictly proportional to the magnetic field surrounding the atoms.

Having regard for the accuracy with which frequencies can be measured nowadays, it will be appreciated that it is possible, by utilizing the properties of the electrons or those of the nuclei, to attain a very high degree of accuracy in measuring the magnetic field.

Although the present invention relates more specifically to magnetometers of the nucleus gyromagnetic resonance type, its extension to magnetometers of the electron gyromagnetic resonance type implies only technological problems, since, all other things being equal, the electron frequencies are significantly higher than the proton or nucleus frequencies.

In order to bring out the frequency in a magnetometer of the nucleus or electron gyromagnetic resonance type, recourse is had to a probe containing a gyromagnetic liquid consisting, for instance, of pure water or doper water and surrounded by a device adapted to produce the hunting phenomenon by the use either of an HF current for proton resonance, or of suitably determined monochromatic light for electron resonance. This probe is surrounded by two coils having a zero mutual induction coefficient. One of these coils, known as the excitation coil, is designed to bring the oscillations of the various protons or electrons into phase and is connected to the output end of an amplifier, while the other coil, known as the detection coil, is connected to the input end of said amplifier. An example of such a disposition is described in the U.S. Pat. No. 3,085,196 filed in the name of Georges Jacques Raymond MARTIN and assigned to Sudaviation Societe Nationale de Constructions Aeronautiques.

Maximum sensitivity is obtained with such a disposition when the magnetic field is directed along the normal common to the axes of the exciting coil and the detecting coil, which direction is hereinafter referred to as the "ideal direction." However, experiment has shown that measurements are still possible provided that the magnetic field makes an angle of less than 50° with the ideal direction. Measurements are for all practical purposes impossible outside the cone of revolution thus defined.

The requirements imposed for the relative directions of the magnetic field to be measured and the ideal direction, in the case of magnetometers with nucleus or electron gyromagnetic resonance, proscribe the use of either type of magnetometer on its own when the instrument is moving through space and susceptible of assuming any orientation relative to the field. This is in fact the case when, with a view to measuring the earth's magnetic field, it is desired to tow the probe of a single magnetometer by means of a line attached to an aircraft.

Attempts have been made heretofore to overcome this drawback, in particular by mounting the magnetometers on stabilized platforms. Recourse has also been had to arrangements utilizing two magnetometers with mutually orthogonal probes, or three magnetometers disposed along the edges of a trirectangular trihedron. All such arrangements however involve complex and costly layouts.

It is the aim of this invention to remedy this drawback and to enable use to be made of a single magnetometer of the gyromagnetic resonance type of which the "dead" solid angle, i.e., the angle within which measurements are virtually impossible, is as small as possible. The invention accordingly is grounded on a method of measuring magnetic fields by gyromagnetic resonance that consists in rotating the excitation field in a plane normal to the axis of the detecting coil and in so controlling such rotation of the field as to cause its direction, which is kept normal to the axis of said coil, to be brought perpendicular to that component of the magnetic field to be measured which lies in said normal plane.

One possible form of application of the method hereinbefore disclosed consists in superimposing upon the magnetic field to be measured a field rotating in the plane perpendicular to the axis of the detecting coil, said rotating field having a low amplitude and a very low frequency, in consequence whereof, from the gyromagnetic standpoint, the field to be measured is to all intents and purposes modulated at very low frequency, thereby providing on the detecting coil a very-low-frequency-modulated signal at the corresponding Larmor frequency, in detecting this signal whereby to extract therefrom a signal of very low frequency, in comparing the phase of this signal to that of the original signal having generated said rotating field, and in utilizing the resulting difference in frequency to rotate the excitation axis in order to place it perpendicular to the magnetic field to be measured.

It is an object of this invention to provide an apparatus for measuring magnetic fields by gyromagnetic resonance and for enabling the method hereinbefore disclosed to be carried into effect, said apparatus comprising a single detecting coil and a single container about which are disposed, in a plane perpendicular to said detecting coil, two pairs of excitation coils respectively aligned onto two mutually perpendicular directions, these four excitation coils being energized by self-oscillation through the agency of a variometer the field magnet of which is connected to a servo-controlling system adapted to bring the excitation axis at right angles to that component of the magnetic field to be measured which lies in said plane disposed perpendicular to the detecting coil.

The invention lastly has for its object industrial applications of the method and apparatus for measuring magnetic fields by gyromagnetic resonance as hereinbefore disclosed, more especially for measuring the intensity, variations and gradient at a plurality of points within the terrestrial magnetic field, most notably aboard aircraft or in a body towed by an aircraft, whereby to permit detection and location of submerged objects such as submarines or wrecks, magnetic charting for learning about the normal magnetic condition of a region, and mineral or oil prospecting by analysis of the magnetic charts obtained.

The description which follows with reference to the accompanying nonlimitative exemplary drawing will give a clear understanding of how the invention can be carried into effect and will disclose yet further features thereof.

Figure 1:
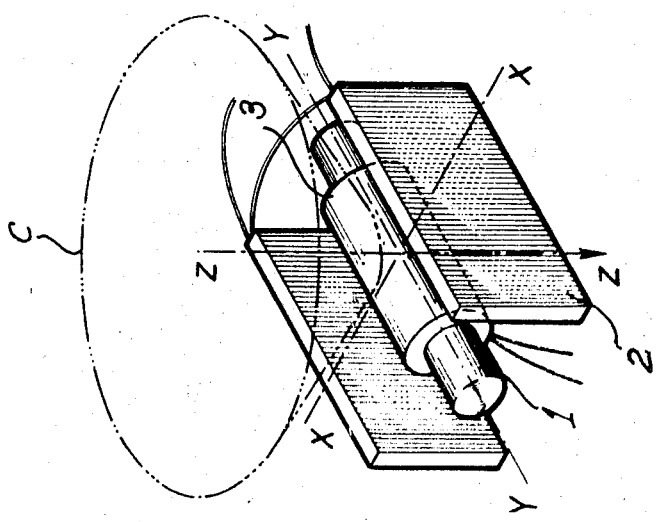

In the drawing:

FIG. 1 shows schematically in perspective a probe associated to a conventional type of nuclear resonance magnetometer, and FIG. 2 is the electric circuit diagram of a nuclear-resonance magnetometer embodiment according to this invention.

A nucleus or proton resonance magnetometer consists of a self-oscillator comprising an electron amplifier and a probe. Said probe (FIG. 1) includes a container 1 inside which is placed a gyromagnetic substance and about which are wound two coils of zero coefficient of mutual induction, to wit the excitation coil 2 and the detecting coil 3. The axis XX, which is the excitation axis, represents the direction of the magnetic field produced by the excitation coil 2 when current flows therethrough, and the axis YY, which is the probe or measurement axis, represents the direction of the magnetic field produced by the detecting coil when current flows therethrough. In order to permit of measuring a magnetic field to which it is subjected, the probe is additionally subjected, in the manner well-known per se, to the effect of a hunting source 20, for instance a coil generating a high frequency alternating field in the specific case of measurements by gyromagnetic resonance of the nucleus. The oscillations obtained under such conditions at the output end of the detecting coil 3 and which are utilized for such measurement have, like the alternating field generated by the excitation coil 2, a frequency which is a function of the value of the magnetic field to be measured, which frequency is the Larmor frequency corresponding to the gyromagnetic substance used in the specific case of measurements by gyromagnetic resonance of the nucleus.

As mentioned precedingly, the arrangement shown in FIG. 1 permits of convenient measurement of a magnetic field when the same is directed as along ZZ, i.e., at right angles both to the excitation axis and the measurement axis, the measurements relevant to such a field remaining feasible provided that the direction of the latter be comprised within the cone of revolution C generated about the axis ZZ with a half-apex angle of 50°.

It is the aim of the present invention to cause the perpendicular ZZ common to the excitation axis XX and the measurement axis YY to be brought, automatically, substantially into the direction of the magnetic field to be measured, irrespective of the orientation of the probe.

This is achieved by rotating the excitation axis, through the agency of a servo-controlling system, in a plane perpendicular to the measurement axis YY whereby to bring it at right angles to the magnetic field component contained in said perpendicular plane.

This in turn causes the validity cone C of FIG. 1 to be turned in the plane perpendicular to the measurement axis YY, thus leaving only a "dead" cone aligned upon said measurement axis. The dead solid angle is evaluated at $0.2 \pi$ steradians, for it has been found extremely difficult to measure a magnetic field making only a slight angle with the measurement axis.

Reference to FIG. 2 shows that there are accordingly arranged, perpendicularly to the detecting coil 3, crossed excitation coils, consisting of two sets of coils 4—4a and 5—5a aligned in pairs and disposed along two mutually perpendicular axes contained in a plane normal to the coil 3. Said coils 4, 4a, 5 and 5a are energized by a variometer 6 in such manner that rotation of the variometer rotatable field winding causes the excitation axis to turn in the plane of the axes of coils 4—4a and 5—5a while its stationary windings are connected to coils 4—4a and 5—5a.

In order to servocontrol the position of said excitation axis and bring it at right angles to that component of the magnetic field to be measured which lies in the plane containing said crossed coils, a resistor 7 and a capacitor 8 are utilized to apply, onto the excitation coils 4, 4a and 5, 5a, a low-amplitude voltage of very low frequency (10 c./s. for instance) delivered by an auxiliary oscillator 9. The corresponding currents generate a rotating field of small amplitude in the plane of the excitation coils, the frequency of which will be 10 c./s. in the example considered. This rotating field combines vectorially with the external field and is added thereto when its direction and sign are the same.

There is then obtained from the output end of the nuclear resonance oscillator comprising the self-oscillator 10 and the probe amplifier 11, a signal at the resonance frequency corresponding to the field to be measured $H_o$ and modulated by a 10 c./s. frequency. The probe amplifier 11 is connected through an analoque-type frequency-meter 12 of any kind passing a 10 c./s. frequency to a filter-amplifier 13 that enables the 10 c./s. signal to be extracted. This 10 c./s. output signal and the signal issuing from the oscillator 9 are applied, possibly after a phase rotation in a rotatable phase-shifter 14, to a phase comparison device 15. The analogue frequency-meter permits of transforming the variable-frequency signal issuing from the magnetometer into a 10 c./s.-modulated direct-current signal of amplitude varying proportionately to the frequency. This in turn permits of feeding an ordinary DC galvanometer graduated directly in magnetic fields.

The system is so adjusted initially that when the 10 c./s. field comes into coincidence with the axis of a reference set of coils (4—4a, say) and the variometer 6 furnishes a field aligned upon the axis common to coils 4, 4a, the 10 c./s. signal issuing from the filter-amplifier 13 is in phase with the signal delivered by the phase-shifter 14 if the field to be measured is normal to the axis common to coils 4, 4a. This requirement is secured during the initial tests by so setting the phase-shifter 14 that the signal from the phase comparison device 15 be zero under such conditions.

If the probe be then subjected to a magnetic field of which the component lying in the plane 4—4a, 5—5a makes an angle $\alpha$ with the normal to the axis common to the coils 4, 4a, i.e., with the axis common to coils 5, 5a, the 10 c./s. signal from the filter-amplifier 13 will be phase-shifted by $\alpha$ relative to the signal from the phase-shifter 14. The phase comparison device 15 delivers across its output terminals 16 and 17 a DC voltage proportional to the phase-shift $\alpha$ and of sign dependent upon the sign of $\alpha$. This DC voltage is utilized to rotate in the appropriate direction a regulating-or servomotor 18 which drives both the rotatable field winding of variometer 6 and the rotatable phase-shifter 14. The servomotor 18 stops when the output voltage from the phase comparison device 15 is zero, i.e., when the field winding of variometer 6 and the phase-shifter 14 have rotated through the angle $\alpha$. The field created by coils 4—4a and 5—5a will then have a direction normal to the magnetic field component lying in the plane of these coils.

Reference numeral 19 designates a measuring instrument for continuously monitoring correct operation of the magnetometer. This instrument must be responsive to 10 c./s. signals and can be a telephone ear piece or an oscilloscope, for instance.

It is to be noted that if the nuclear oscillation should cease due to poor orientation of the magnetic field relative to the probe, the filter-amplifier 13 will not deliver an output signal. Thus, the measuring instrument 19 will give no further reading so that it indicates the poor operation of the magnetometer. Nevertheless, a continuous DC voltage will then be delivered by the phase comparison device 15. This DC voltage will rotate the servomotor 18 until acquisition conditions are obtained once more and the nuclear oscillation triggers the servo-controlling process anew.

By virtue of the thus obtained servocontrol, it becomes possible to measure the terrestrial magnetic field either by mounting the apparatus of FIG. 2 in an aircraft or by towing it behind an aircraft. It is thus feasible to measure the absolute value of this field as well as its variations and its gradient at different points therein, most notably for the purpose of detecting and locating submerged objects such as wrecks or submarines. It is also possible to plot magnetic charts and to use them for mineral or oil prospecting.

It goes without saying that many modifications could be made to the method and apparatus hereinbefore described. By way of example, in specific instances where it is considered that the magnetic field might make too small an angle with the probe axis to enable it to be measured, it would suffice to duplicate the equipment described hereinabove and to use two distinct probes having mutually perpendicular axes. Similarly, the circuitry of FIG. 2 could be resorted to for use with a magnetometer of the electron gyromagnetic resonance type comprising crossed exciter coils and a detecting coil similar to coils 4, 4a, 5, 5a and 3.

What we claim is:

1. In an apparatus for measuring magnetic fields by gyromagnetic resonance, of the kind having a single container with a gyromagnetic substance and a detecting coil wound around said container, said gyromagnetic substance being subjected to the magnetic field to be measured and, excitation at a suitable frequency thereby to change the electron energy level of the substance; the improvement comprising, in combination, two pairs of excitation coils respectively aligned along two mutually perpendicular axes and disposed around the detecting coil in a plane perpendicular to said detecting coil, the excitation coils aligned along the same axis being interconnected, a variometer having stationary windings respectively connected to the pairs of aligned excitation coils and a rotatable field winding, means for feeding said rotatable field winding with the signals issued from the detecting coil, and servo-controlling means connected to said rotatable field winding in order to place, by rotation of said field winding, the axis of the excitation field perpendicular to that component of the magnetic field to be measured which lies in said plane perpendicular to the detecting coil.

2. In an apparatus for measuring magnetic fields by gyromagnetic resonance, of the kind having a single container with a gyromagnetic substance and a detecting coil wound around said container, said gyromagnetic substance being subjected to the magnetic field to be measured and excitation at a suitable frequency thereby to change the electron energy level of the substance; the improvement comprising, in combination, two pairs of excitation coils respectively aligned along two mutually perpendicular axes and disposed around the detecting coil in a plane perpendicular to said detecting coil, the excitation coils aligned along the same axis being interconnected, a variometer having stationary windings respectively connected to the pairs of aligned excitation coils and a rotatable field winding, a device for generating signals at very low frequency connected to said excitation coils in order to generate by said excitation coils a rotating field at said very low frequency, an amplifier the input of which is connected to the detecting coil while its output is connected to said rotatable field winding, means for detecting the signals issuing from the detecting coil and connected to the amplifier output for obtaining detected signals at said very low frequency, means for generating an electrical voltage proportional to the phase difference existing between the signals issued from the signal generating device and the detected signals and connected to said signal generating device and to said detecting means, and servo-controlling means connected to said rotatable field winding and fed by said voltage generating device for controlling the rotation of said field winding in relation to said phase difference.

3. An apparatus according to very low frequency the device for generating signals at very low frequency comprises an auxiliary oscillator generating signals at very low frequency under voltages of low amplitude, a resistor and a capacitor which are connected with said oscillator and respectively to the two pairs of aligned excitation coils.

4. An apparatus according to claim 3, wherein the detecting means comprises an analogue frequency-meter connected to the output of the amplifier, and a filter-amplifier connected to the output of said frequency-meter in order to extract the signal at very low frequency delivered by the oscillator.

5. An apparatus according to claim 4, wherein the voltage generating means and the servo-controlling means comprise a rotatable phase-shifter connected to the output of the auxiliary oscillator, a phase comparison device connected, on the one hand, to the filter-amplifier and on the other hand, to said rotatable phase-shifter, and a motor mechanically coupled to said rotatable phase-shifter and to the rotatable field winding and fed by the output voltage of said phase comparison device.

6. An apparatus according to claim 5, wherein the initial setting of the rotatable phase-shifter is so adjusted that when the rotating field becomes coincident with the axis along which a pair of excitation coils is aligned and which acts as a reference axis and when the variometer generates a field directed along said reference axis, the very low frequency signal issued from the filter-amplifier is in phase with that issuing from the rotatable phase-shifter if the magnetic field to be measured has its direction at right angles to said reference axis.

7. In an apparatus for measuring magnetic fields by gyromagnetic resonance, of the kind having a single container with a gyromagnetic substance and a detecting coil wound around said container, said gyromagnetic substance being subjected to the magnetic field to be measured and excitation at a suitable frequency thereby to change the electron energy level of the substance; the improvement comprising, in combination, two pairs of excitation coils respectively aligned along two mutually perpendicular axes and disposed around the detecting coil in a plane perpendicular to said detecting coil, the excitation coils aligned along the same axis being interconnected, a variometer having stationary windings respectively connected to the pairs of aligned excitation coils and a rotatable field winding, a device for generating signals at very low frequency connected to said excitation coils in order to generate by said excitation coils a rotating field at said very low frequency, an amplifier the input of which is connected to the detecting coil while its output is connected to said rotatable field winding, means for detecting the signals issuing from the detecting coil and connected to the amplifier output for obtaining detected signals at said very low frequency, and means connected to said rotatable field winding, to said signal generating device and to said detecting means for servo controlling the direction of the excitation field in relation to the phase difference existing between the very low-frequency signals issued from said signal generating device and the detected signals at said very low frequency.

8. An apparatus according to claim 7, wherein the detecting and servo-controlling means comprise an analogue frequency-meter connected to the output of the amplifier, a filter-amplifier connected to the output of said frequency-meter in order to extract the signal at very low frequency delivered by the oscillator, a rotatable phase-shifter connected to the output of the auxiliary oscillator, a phase comparison device connected, on the one hand, to the filter-amplifier and, on the other hand, to said rotatable phase-shifter, and a motor mechanically coupled to said rotatable phase-shifter and to the rotatable field winding and fed by the output voltage of said phase comparison device.

9. In an apparatus for measuring magnetic fields by gyromagnetic resonance, of the kind having a single container with a gyromagnetic substance and a detecting coil wound around said container, said gyromagnetic substance being subjected to the magnetic field to be measured and excitation at a suitable frequency thereby to change the electron energy level of the substance; the improvement comprising, in combination, two pairs of excitation coils respectively aligned along two mutually perpendicular axes and disposed around the detecting coil in a plane perpendicular to said detecting coil, the excitation coils aligned along the same axis being interconnected, a variometer having stationary windings respectively connected to the pairs of aligned excitation coils and a rotatable field winding, an amplifier the input of which is connected to the detecting coil while its output is connected to said rotatable field winding, an auxiliary oscillator generating signals at very low frequency under voltages of low amplitude, a resistor and a capacitor which are connected with said oscillator and respectively to the two pairs of aligned excitation coils, an analogue freguency-meter connected to the output of the amplifier, a filter-amplifier connected to the output of said frequency-meter in order to extract the signal at very low frequency delivered by the oscillator, a rotatable phase-shifter connected to the output of the auxiliary oscillator, a phase comparison device connected, on the one hand, to the filter-amplifier and, on the other hand, to said rotatable phase-shifter, and a motor mechanically coupled to said rotatable phase-shifter and to the rotatable field winding and fed by the output voltage of said phase comparison device.

* * * * *